June 8, 1954
H. W. HEIN
2,680,411
DIAPHRAGM MILK RELEASER
Filed July 15, 1950
3 Sheets-Sheet 3
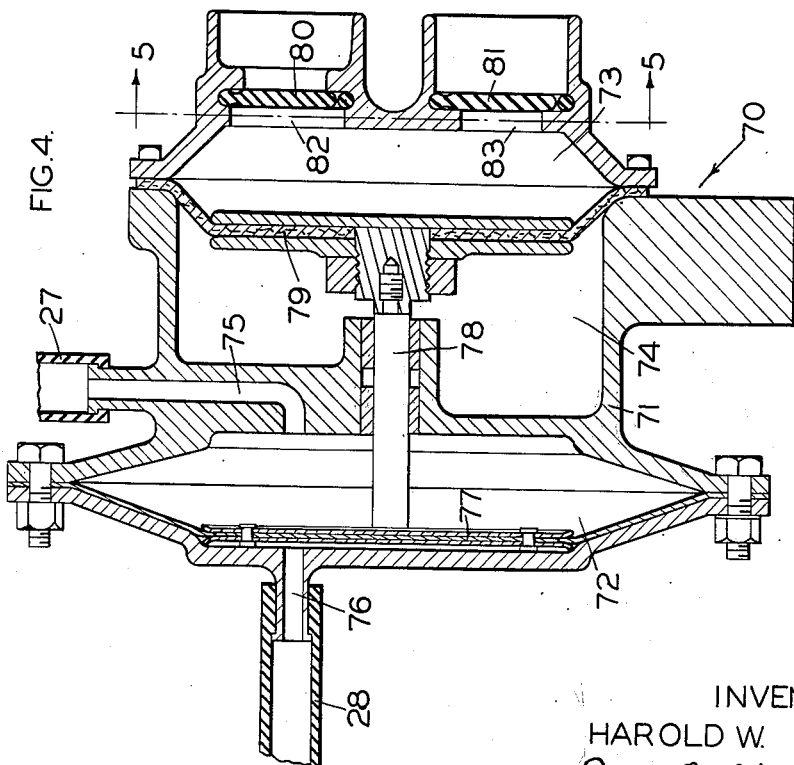
INVENTOR
HAROLD W. HEIN
Paul O. Pippel
ATT'Y Patented June 8, 1954

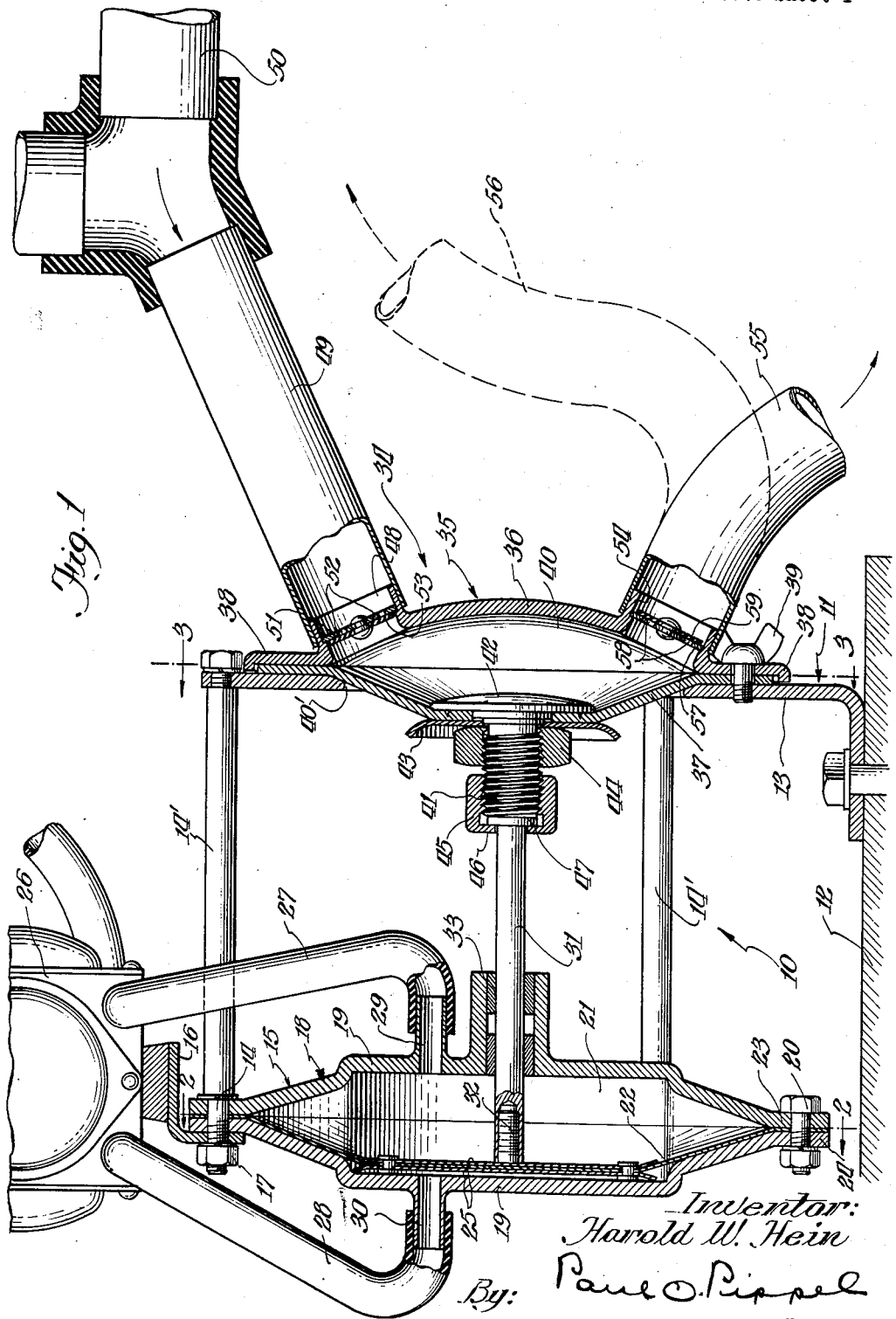

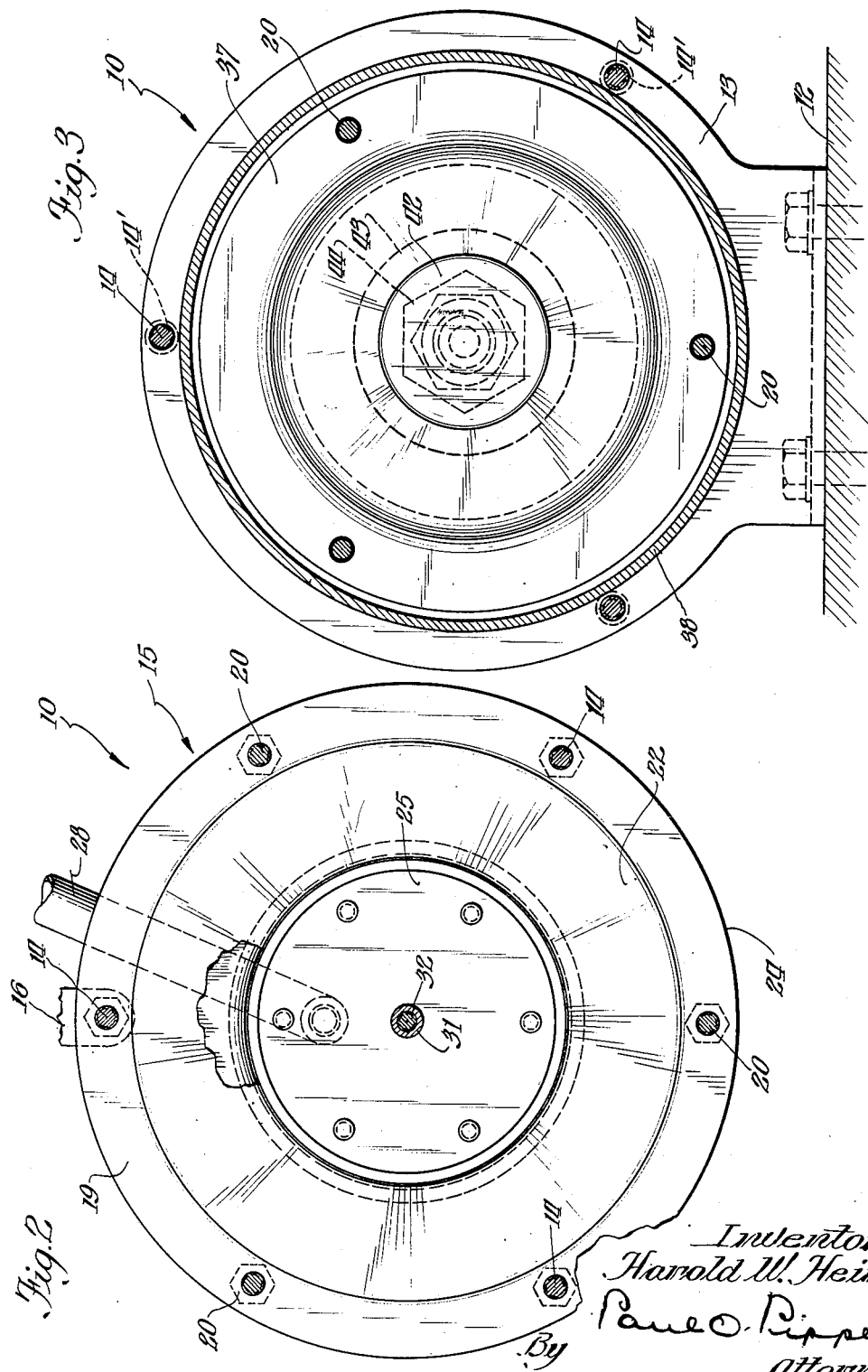

2,680,411

UNITED STATES PATENT OFFICE 2,680,411

DIAPHRAGM MILK RELEASER

Harold W. Hein, Chicago, Ill., assignor to International Harvester Company, a corporation of New Jersey Application July 15, 1950, Serial No. 174,031

1 Claim. (Cl. 103—152)

This invention relates to a releaser milker system. More specifically, the invention relates to a milk releaser especially adapted for connection to a vacuum line which transports milk, the milk releaser being effective for receiving and discharging milk simultaneously with the operation of a milking system.

In the operation of pipe line milking installations, a milk receiving conduit is connected to a source of vacuum. The conduit is also in communication with one or more milkers which milk the animals and deliver the milk to the pipe line under vacuum. In order to release the milk from the vacuum line simultaneously with the operation of the milkers it is necessary to provide a releaser that will release the milk without disturbing, to an appreciable degree, the vacuum pressures existing within the line. The need for an effective milk releaser has given rise to many different types of constructions, some of which have been found adequate in operation but too expensive to construct and maintain. It is applicant's prime object to provide an improved milk releaser of a simplified construction, the milk releaser operating in conjunction with a pulsating unit of a type that is generally employed during the milking operation.

Still another object is to provide a milk releaser having a diaphragm structure which is operable to receive milk from a pipe line system when the structure is placed under a vacuum condition, the structure also being operable to release the milk and discharge it from the diaphragm structure when a diaphragm is moved in a manner exerting a positive pressure within the structure.

A still further object is to provide a milker releaser including a pair of laterally spaced diaphragm structures, one of the structures including valve mechanisms operable to regulate the inlet and discharge of milk and the other diaphragm structure serving as a power actuator for operating the first diaphragm structure.

Still another object is to provide a diaphragm milk releaser, the releaser being especially adapted for connection to the pipe system of a milking installation and also operable to release the milk from the system and to raise the milk discharged from the releaser to a higher level than the level of the pipe line.

Still another object is the provision of a diaphragm type of milk releaser having first and second diaphragm chambers, the diaphragm chambers being separated by a third chamber sealed from the atmosphere, one of the diaphragms being movable with respect to the third chamber to provide a pressure differential within the third chamber with respect to the second chamber during one stage of operation of said releaser.

Other important objects will become more apparent to those skilled in the art as the disclosure is more fully made in the drawings illustrating the invention.

Fig. 1 is a cross sectional view through a milk releaser showing the releaser connected to portions of a pipe line milking system.

Fig. 2 is a sectional view in elevation through a diaphragm or actuating mechanism taken substantially along the line 2—2 of Fig. 1.

Fig. 3 is a sectional view in elevation through a milk releaser diaphragm, the view being taken substantially along the line 3—3 of Fig. 1.

Fig. 4 is a cross sectional view in elevation of a modified form of milk releaser.

Fig. 5 is a sectional view of a valve arrangement, the view being taken substantially along line 5—5 of Fig. 4, showing a modified form of the invention.

As best shown in Fig. 1, a milk releaser is generally indicated by the reference character 10. The milk releaser 10 includes a frame 11 which may be suitably connected to a base 12. The frame 11 includes an upright plate 13 which is provided, as best shown in Figs. 1 and 2, with a plurality of laterally extending bolts 14 having threaded thereon spacers 14' which suitably space a diaphragm structure 15 which is supported by the bolts 14. The uppermost bolt 14, as best shown in Fig. 1, also supports a bracket 16 which is rigidly secured to the structure 15 by means of the nut 17.

The diaphragm structure 15 includes a casing 18 consisting of a pair of dish-shaped plates 19 having their outer annular edges suitably connected by bolt and nut connections 20. The plates 19 are so disposed as to form a diaphragm chamber 21. The diaphragm chamber 21 contains a first diaphragm or flexible membrane 22 which has its outer peripheral edges rigidly secured between annular edges 23 and 24 of the plates 19. The membrane or first diaphragm 22 has a central portion securely held between a pair of plates 25.

The bracket 16 suitably supports a vacuum pulsating mechanism 26. This pulsating mechanism may be of a type as shown in the Floyd G. Hodsdon Patent 1,844,853, patented February 9, 1932. The pulsating mechanism 26 includes a pair of alternating vacuum and atmosphere conduits 27 and 28 which are respectively connected to connections 29 and 30 communicating with the diaphragm chamber 21. The connections 29 and 30 are disposed on the casing 18 on opposite sides of the first diaphragm 22. A connecting rod or reciprocable member 31 is secured to the plates 25 by means of a threaded stud 32 which is secured to one of the plates 25 and is threaded into one end of the rod 31. The connecting rod 31 is mounted for reciprocation on a bearing 33 suitably supported on the casing 18.

A diaphragm structure 34 is laterally positioned with respect to the diaphragm structure 15. The diaphragm structure 34 includes a casing generally designated at 35. The casing 35 includes a dished-shaped plate 36 which securely holds the outer edges of a second diaphragm or membrane 37 by means of an annular edge 38. The second diaphragm 37 has its outer edge securely compressed between the annular edge 38 and the plate 13 by means of wing bolts 39, only one of which is shown. The second diaphragm 37 forms with the dish-shaped plate 36 a diaphragm chamber 40. The plate 13 is provided with a centrally disposed opening 40' which permits oscillation of the second diaphragm 37 with respect to the plate 36.

The second diaphragm 37 is securely connected to the connecting rod 31 by means of a threaded stud 41 which has an enlarged head 42 engaging an inner face of the diaphragm 37. The second diaphragm 37 is securely held between the head 42 and a washer 43 by means of a nut 44. An internally threaded nut 45 is provided with a collar 46, the collar 46 securely engaging a shoulder 47 of the connecting rod 31. As shown in Fig. 1 the nut 45 is securely tightened on the threaded stud 41 to positively secure the connecting rod 31 to the diaphragm 37.

The upper end of the plate 36 is provided with an inlet connection 48, the connection 48 being adapted to connect to a conduit 49 which is in communication with the pipe line 50. The pipe line 50 is connected to milking machines (not shown), the pipe line 50 containing a vacuum depression and also receiving milk from the milking machines. The inlet connection 48 may be placed into communication with the chamber 40 by means of a valve plate 51 having a plurality of openings 52. A flexible membrane or valve 53 is suitably connected to the valve plate 51, the valve 53 being arranged to open inwardly toward the chamber 40 during a vacuum depression within said chamber.

An outlet connection 54 is disposed at the lower portion of the plate 36. The outlet connection 54 is adapted to communicate with a conduit 55, the conduit also forming part of a pipe line milking system (not shown). The conduit 55 generally delivers milk as it is released in a normal state of atmosphere to the proper containers which are provided for that purpose. As best shown by the reference character 56 the conduit 55 may also be positioned to deliver milk upwardly to a level which may be higher than the point at which the milk leaves the milk releaser or the pipe line of the system. The outlet connection 54 includes a valve plate 57 which is provided with openings 58 adapted to place said conduit 55 in communication with the chamber 40. The valve plate has suitably connected thereto a flexible membrane or valve 59, this valve 59 being positioned to open outwardly from chamber 40 during a positive pressure within said chamber.

The modified form of the invention shown in Figs. 4 and 5 is very similar to the above described releaser. Figs. 4 and 5 disclose a releaser generally indicated by the reference character 70. The releaser 70 comprises a casing 71 having a first diaphragm chamber 72 and a second diaphragm chamber 73. A third or intermediate chamber is designated at 74.

The chamber 72 is provided with conduits 75 and 76 which like conduits 29 and 30 are in communication with a pulsator by means of the conduits 27 and 28. A first actuating diaphragm 77 is connected to a connecting rod or reciprocable member 78 which is connected to a second diaphragm 79 interposed between chambers 73 and 74. The chamber 74 is sealed from the atmosphere for a purpose which will appear from the ensuing operation.

The chamber 73 is provided with a valve 80 which opens inwardly into said chamber during a vacuum depression therein. A valve 81 is positioned to open outwardly of the chamber 73 during a positive pressure in said chamber. The valves 80 and 81 are respectively positioned over openings 82 and 83.

*The operation*

The pipe line 50 is under a vacuum depression, this line also transporting milk from the milking machines (not shown). In order to simultaneously discharge milk from the pipe line 50 during the milking operation, the milk releaser 10 is set into operation. The power for the releaser 10 is derived from the pulsating mechanism 26 which as indicated may be of the type shown in the Hodsdon patent above mentioned. The type of pulsator disclosed in the above patent is generally connected to a suitable vacuum source. Reciprocating valves within the pulsator are actuated by the vacuum source to provide for intermittent or alternating pulsations of vacuum and atmosphere. As shown in Fig. 1 the conduits 27 and 28 are arranged to transmit the alternating vacuum and atmosphere pulsations to the diaphragm chamber 21 by means of the connections 29 and 30. In the position of the first diaphragm 22 as shown in Fig. 1 the connection 30 and the conduit 28 are in communication with the atmosphere by means of suitable valve elements (not shown) in the pulsator 26. The conduit 27 at this stage is placed under a vacuum depression, causing the first diaphragm 22 to move to the right of the chamber 21. This forces the connecting rod or reciprocable member 31 to the right, thereby collapsing the second diaphragm 37 against the plate 36. Any liquid contained within the chamber 40 at this point is, of course, discharged through the openings 58 which are uncovered by the valve 59 by virtue of the pressure exerted, this valve moving or opening outwardly of the chamber 40. During positive pressure within the chamber 40 the valve 53 is maintained in a closed position tightly against the valve plate 51.

After the membrane or first diaphragm 22 has moved to the right end of the chamber 21 the conduit 27 is immediately placed in communication with the atmosphere by means of the pulsating mechanism 26 and the conduit 28 is placed under a vacuum. Thus the first diaphragm 22 is moved to the left end of the chamber 21. As the first diaphragm 22 moves in this direction the second diaphragm 37 is moved to the position shown in Fig. 1. During this movement the valve 59 is tightly closed over the openings 58 and a vacuum depression is provided within the chamber 40.

The depression within the chamber 40 which is created by movement of the second diaphragm 37 is greater than the depression which is present within the pipe line 50 and pipe line 49. Thus as the second diaphragm 37 is moved to the position disclosed, the valve 53, due to the pressure differential, is drawn inwardly toward the chamber 40 whereupon the openings 52 are uncovered. This permits the in-flow of milk into the chamber 40 almost instantly filling this chamber. As the first diaphragm 22 is again moved to the right of the chamber 21 the second diaphragm 37 is pushed to its collapsed position against the plate 36. The milk in the chamber 40 is thus pushed outwardly through the openings 58 into the conduit 55. Thus it can be seen a complete cycle of operation has been described. It must, of course, be understood that pulsating mechanisms of the type indicated have a rapid operation and thus the diaphragm structure 15 is effective to act as a power actuator for rapidly oscillating the second diaphragm 37. By this rapid oscillation of the second diaphragm 37 it can be seen that large quantities of milk can be released from the pipe line system 50 and discharged through the conduit 55. The force exerted by the diaphragm structure or power actuator 15 is sufficient to raise the milk to a point much higher than the point at which the milk is discharged. An arrangement of this type can be seen by the reference character 56 wherein the conduit 55 is so positioned as to direct the milk upwardly to a greater height.

The operation of the modification shown in Figs. 4 and 5 is generally the same as the operation of the releaser 10 above described. Upon oscillation of the first diaphragm 77 and the connecting rod 78 the second diaphragm 79 is oscillated, thereby alternately filling chamber 73 with milk and discharging the same from said chamber.

In the releaser 70 the chamber 74 is sealed from the atmosphere. When the releaser is assembled, however, the pressure within the chamber 74 will be the same as atmospheric pressure, care being taken that the first and second diaphragms 77 and 79 are in the position shown in Fig. 4 during assembly. As the chamber 72, on the right side of the first diaphragm 77, is subject to a vacuum depression, the second diaphragm 79 will move to the right expelling milk in the chamber 73. As the second diaphragm 79 is thus moved the pressure within chamber 74 decreases below the atmospheric pressure so that there is a pressure differential between chambers 74 and 73. The chamber 73 is thus provided with a higher pressure which will urge the diaphragm to return to the position shown in Fig. 4. This pressure differential then will assist the first diaphragm 77 in returning the diaphragm to its initial position when a depression takes place within the chamber 72 and the left face of the first diaphragm 77. In other words, the pressure differential between chambers 73 and 74 will assist the first diaphragm 77 in returning both diaphragms to their position shown in Fig. 4. In effect it has been found that by this arrangement a smooth and more effective operation results.

The releaser thus is particularly adapted to pipe line milking systems where a rapid and efficient release of the milk is necessary. The construction is inexpensive to manufacture and to maintain and the operating cost is negligible since a pulsating mechanism may be utilized, the pulsating mechanism deriving its power from the vacuum source which is normally used during the milking operation.

A positive releaser mechanism has thus been described and it can readily be seen that the releaser parts may easily be washed by simply disassembling the parts upon removal of the wing bolts 39. The power actuator or diaphragm structure 15 is completely removed from the releaser parts which require a high degree of sanitation. Thus the possibility of contamination of the milk is clearly minimized.

It is believed that a novel, improved and practical milk releaser has been described and disclosed. It must be understood, of course, that changes and modifications may be made which do not depart from the spirit of the invention as disclosed and from the scope thereof as defined in the appended claim.

What is claimed is:

A milk releaser comprising a casing having first and second diaphragm chambers, a sealed third chamber positioned between said first and second chambers, a first diaphragm positioned for oscillation within said first chamber, a second diaphragm positioned for oscillation between said second chamber and said third chamber, a connecting rod connecting said first and second diaphragms, means for oscillating said first and second diaphragms including a vacuum operated pulsator having a first connection communicating with the first diaphragm chamber on one side of the diaphragm, a second connection from the pulsator communicating with the first diaphragm chamber on an opposite side of the first diaphragm, said pulsator being arranged to provide for alternating vacuum and atmosphere pulsations within said first diaphragm chamber on opposite sides of said first diaphragm, thereby oscillating the first diaphragm to provide for reciprocation of the rod and oscillation of the second diaphragm to first and second positions, a valve means in communication with the second chamber to provide for the inflow of liquid to said chamber during a vacuum depression in said second chamber during movement of said second diaphragm to the first position, a second valve means in communication with the second chamber to provide for the discharge of liquid from said chamber during pressure within said chamber upon movement of said second diaphragm to the second position, said sealed third chamber being normally under atmospheric pressure and having therein a vacuum depression during movement of the second diaphragm to the second position, the pressure differential between said second and third chambers being effective to urge said second diaphragm to return to its first position in concert with the action of said oscillating means.

References Cited in the file of this patent

UNITED STATES PATENTS

| Number | Name | Date |
|---|---|---|
| 862,867 | Eggleston | Aug. 6, 1907 |
| 952,770 | Thompson | Mar. 22, 1910 |
| 1,226,842 | Anderson | May 22, 1917 |
| 1,247,329 | Ridd | Nov. 20, 1917 |
| 1,529,918 | Richards | Mar. 17, 1925 |
| 1,995,611 | Hapgood | Mar. 26, 1935 |